(12) United States Patent
Yamanashi et al.

(10) Patent No.: US 6,866,914 B2
(45) Date of Patent: Mar. 15, 2005

(54) ARTIFICIAL STONE HAVING NON-SLIP PROPERTY

(75) Inventors: Sumiyo Yamanashi, Tokyo (JP); Mieko Sakai, Tokyo (JP); Kenichiro Saito, Chiba (JP)

(73) Assignee: Doppel Co., Ltd., Tokyo (JP)

( * ) Notice: Subject to any disclaimer, the term of this patent is extended or adjusted under 35 U.S.C. 154(b) by 23 days.

(21) Appl. No.: 10/343,451

(22) PCT Filed: Aug. 1, 2001

(86) PCT No.: PCT/JP01/06628

§ 371 (c)(1),
(2), (4) Date: Mar. 12, 2003

(87) PCT Pub. No.: WO02/10087

PCT Pub. Date: Feb. 7, 2002

(65) Prior Publication Data

US 2004/0048042 A1 Mar. 11, 2004

(30) Foreign Application Priority Data

Aug. 1, 2000 (JP) ........................................ 2000-233513

(51) Int. Cl.$^7$ .............................. B32B 3/30; B32B 3/26; B32B 5/16
(52) U.S. Cl. ........................ 428/143; 428/149; 428/150; 428/220; 428/167; 428/168; 428/908.8; 404/19; 404/20; 52/315; 52/316; 52/311.1; 52/309.14; 52/177; 52/181
(58) Field of Search ................................. 428/143, 149, 428/150, 220, 167, 168, 908.8; 404/19, 20; 52/315, 316, 311.1, 309.14, 177, 181

(56) References Cited

U.S. PATENT DOCUMENTS

| 3,170,808 | A | * | 2/1965 | Almy et al. ................. 427/559 |
| 3,378,617 | A | * | 4/1968 | Elmendorf ................... 264/162 |
| 5,527,387 | A | * | 6/1996 | Andersen et al. ............ 106/693 |
| 6,167,879 | B1 | * | 1/2001 | Sievers et al. ................. 125/1 |
| 6,365,662 | B1 | | 4/2002 | Sakai et al. |
| 6,673,417 | B1 | * | 1/2004 | Gudet ......................... 428/156 |

FOREIGN PATENT DOCUMENTS

| EP | 1 048 631 | 11/2000 |
| JP | 5-117008 | 5/1993 |
| JP | 7-100816 | 4/1995 |
| JP | 9-227188 | 9/1997 |
| JP | 10-252234 | 9/1998 |
| JP | 11-92194 | 4/1999 |
| JP | 11-322392 | 11/1999 |
| WO | 99/36371 | 7/1999 |

* cited by examiner

*Primary Examiner*—William P. Watkins, III
(74) *Attorney, Agent, or Firm*—Wenderoth, Lind & Ponack, L.L.P.

(57) ABSTRACT

A novel artificial stone which contains an inorganic aggregate and a resin and has an uneven surface wherein the inorganic aggregate is exposed, wherein the average depth of concave grooves of the surface is in the range of 0.02 mm to 1.0 mm and the volume percentage of the inorganic aggregate is 25% to 75%. The artificial stone has an elaborate structure, exhibits transparent and deep sense, has excellent massive feeling and color like a marble, has a high surface hardness, exhibits good formability, and exhibits excellent non-slop performance even when it is contacted by bare feet or by hard soles of shoes.

32 Claims, 9 Drawing Sheets

EXAMPLE OF THE TENSILE LOAD/TIME CURVE
AND THE SCRATCHING FORCE G

ARTIFICIAL STONE HAVING NON-SLIP PROPERTY

TECHNICAL FIELD

The present invention of the invention of the present application relates to a non-slipping artificial stone. Further specifically, the invention relates to a granite-like or marble-like non-slipping artificial stone having the excellent characteristics including the excellent feeling, good surface hardness and surface wear resistance, or the like, a non-slipping property in the surface capable of preventing slipping at the time of walking, or the like, with a light weight and a high hardness. That is, it relates to a non-slipping artificial stone useful for the interior floors of a bathroom, a toilet, a kitchen, or the like, the exterior floors of a poolside, an entrance, or the like, a bath tub, the other applications, the members for public institution such as an underground shopping mall passage, a step, and a railway platform, and furthermore, a wet floor surface and a floor surface with an oil component scattered in various kinds of working places, treatment plants, factories, or the like with existence of water or an oil inevitably.

BACKGROUND ART

Conventionally, a method of obtaining an artificial stone by pulverizing a natural stone to an optional size, mixing a calcium carbonate or the like and a resin therewith and hardening has already been known.

According to such an artificial stone, efforts have been made for realizing the heavy granite-like or marble-like surface having the transparency and the depth according to the composition thereof and improvement of the production method.

In contrast, with the attempt for the improvement, improvement of the function of the artificial stone has been discussed.

However, in the case of most conventional artificial stones, an artificial stone having a marble-like heavy depth in the surface, a transparency, and sufficient strength, hardness and durability as a stone material is not realized yet. Moreover, the improvement of the function is indeed the task to be tackled in the future.

In such a situation, the present inventors of the application have developed artificial stones essentially different from the conventional artificial stones, having the unprecedented feeling, tone and physical property. Then, the present inventors of the application have provided a novel function to the artificial stones for facilitating expansion of the application thereof.

In the process of the discussion, it was learned that an artificial stone provided with a non-slipping property in the surface thereof for preventing slipping at the time of walking thereon, or the like is extremely important from the viewpoint of the function and the application.

That is, for the interior floors of a bathroom, a toilet, a kitchen, or the like, the exterior floors of a poolside, an entrance, or the like, a bath tub, a step or a passage in a town, a railway platform, a public institution, a factory floor, or the like, surface non-slipping property is an important function for security and disaster prevention, and thus it is an indispensable element. Furthermore, in the case of the artificial stones, such a non-slipping property of preventing slippage has hardly been discussed in the real situation.

For example, so far, as an artificial stone provided with a non-slipping process and a production method for the artificial stone, a process of forming ruggedness in the surface part by a water jet process of the surface part of an artificial stone provided with a polish process for cutting out and eliminating the resin part of the artificial stone surface comprising a grain-like stone material part and a resin part is proposed (JP-A No. 100816, Tajima Corp.). However, the proposal is just for disclosing a known method of a water jet process of an artificial stone and commonly known knowledge in the construction and engineering techniques of improving the slippage preventing performance by the surface ruggedness, and thus basic problems and means such as the characteristics of the non-slipping performance in the artificial stone surface, how the performance can be improved, or the like are not mentioned at all.

Then, the present inventors of the application have elaborately discussed for realizing an artificial stone having strength and hardness required for the floor material, or a floor surface of a step, a passage, a street, a railway platform, and a public institution, a beautiful appearance same as or more than a natural stone material, and the above-mentioned non-slipping property.

In the process of the discussion, effectiveness of having a specific composition configuration of an artificial stone, that is, having the ratio of the resin component by 15% by weight or less at the time of eliminating the surface resin part by water jetting after surface polish for improvement of the non-slipping characteristic, and further improvement of the non-slipping performance in this case by having the ratio of the resin exposed flat surface area occupied in the unit surface (50×50 mm) by 15% or more and 40% or less have been found out so as to propose the same as a novel technique (JP-A No. 9-227188, WO99/36371).

However, in the discussion thereafter, a further essential factor has been found out as to the non-slipping performance. Moreover, it was learned that the points to be borne in mind are different for the case of a poolside, a bath tub, a bath room floor material, or the like to be contacted with bear feet and the case of a passage, a sidewalk, or the like to be contacted with hard shoe soles, or the like.

Accordingly, an object of the invention of the present application is to provide a novel artificial stone having a dense organization, transparency and depth, the excellent marble-like feeling and tone, or the like, a large surface hardness, a good shaping property, and the excellent non-slipping performance in the case of contact with bare feet or in the case of contact with hard shoe soles according to the limit of the conventional technique or the study by the inventors above mentioned.

DISCLOSURE OF INVENTION

The invention of the present application has been achieved for solving the above-mentioned problems. A first aspect provides a non-slipping artificial stone containing an inorganic aggregate and a resin, having a rugged surface with the inorganic aggregate exposed, wherein the average depth of the surface recessed groove part is in a range of 0.02 mm or more and 1.0 mm or less, and the volume percentage of the inorganic aggregate is 25% or more and 75% or less.

Moreover, a second aspect of the invention of the present application provides the above-mentioned artificial stone, wherein the average depth of the surface recessed groove part is 0.05 mm or more and 0.8 mm or less. A third aspect provides the non-slipping artificial stone, wherein the volume percentage of the inorganic aggregate is 35% or more and 65% or less. A fourth aspect provides the non-slipping artificial stone, wherein the inorganic aggregate exposed on the surface has a sharp corner part. A fifth aspect provides the non-slipping artificial stone, wherein the radius of curvature of the corner part is 1 mm or less. A sixth aspect provides the non-slipping artificial stone, wherein the maximum particle size of the inorganic aggregate is ½ or less of the plate thickness at the time of placing and hardening. A seventh aspect provides the non-slipping artificial stone, wherein the maximum particle size of the inorganic aggregate is 0.15 mm or more and 10 mm or less. An eighth aspect provides the non-slipping artificial stone, wherein the hardness of the inorganic aggregate is 5 or more in the Mohs hardness.

A ninth aspect of the invention of the present application provides the non-slipping artificial stone according to any one of the above-mentioned inventions, wherein the inorganic aggregate is prepared by the particle size distribution ratio of closest packing or in the vicinity thereof, and placed and hardened.

Furthermore, a tenth aspect of the invention of the present application provides a non-slipping artificial stone containing an inorganic aggregate and a resin, having a rugged surface with the inorganic aggregate exposed, wherein the slip resistance value BPN (ASTM E303) is 60 or more in the wet surface, and it is 20 or more in the oily surface. An eleventh aspect provides the above-mentioned non-slipping artificial stone, wherein the slip resistance value BPN is 65 or more in the wet surface, and it is 35 or more in the oily surface.

A twelfth aspect of the invention of the present application provides a non-slipping artificial stone containing an inorganic aggregate and a resin, having a rugged surface with the inorganic aggregate exposed, wherein the slip resistance value C. S. R. is 0.8 or more in the wet surface in the case of men's hard sole shoes. A thirteenth aspect provides the above-mentioned non-slipping artificial stone, wherein the slip resistance value C. S. R. is 0.45 or more in the oily surface.

A fourteenth aspect of the invention of the present application provides a non-slipping artificial stone containing an inorganic aggregate and a resin, having a rugged surface with the inorganic aggregate exposed, wherein the slip resistance value C. S. R. B is 1.4 or more in the wet surface in the case of bare, feet. A fifteenth aspect provides the non-slipping artificial stone, wherein the slip resistance value C. S. R. B is 0.8 or more in the soap surface in the case of bare feet. A sixteenth aspect provides a non-slipping artificial stone containing an inorganic aggregate and a resin, having a rugged surface with the inorganic aggregate exposed, wherein the surface contact angle in the case of the distilled water is in a range of 45 to 75 degrees on average. A seventeenth aspect provides the above-mentioned non-slipping artificial stone, wherein the average contact angle is 55 to 72 degrees.

Furthermore, an eighteenth aspect of the invention of the present application provides the artificial stone of any one of the above-mentioned inventions, wherein the surface is provided with the water jet process by cutting or dividing into a predetermined shape or thickness, or without cutting or dividing after placing and hardening the artificial stone composition containing the inorganic aggregate and the resin in a shaping mold. A nineteenth aspect provides the non-slipping artificial stone provided with the polish process before the water jet process.

Moreover, a twentieth aspect of the invention of the present application provides a non-slipping structure, wherein the non-slipping artificial stone according to any one of the above-mentioned inventions is laminated as the surface material. A twenty first aspect provides a non-slipping structure, wherein the non-slipping artificial stone according to any one of the above-mentioned inventions is used as a part of the surface.

BEST MODE FOR CARRYING OUT THE INVENTION

Figure 1:
FIG. 1 is a metal microscope photograph showing the cross-section of an example of a non-slipping artificial stone of the present invention.

The invention of the present application has the above-mentioned characteristics. Hereinafter, embodiments thereof will be explained.

First, a non-slipping artificial stone provided by the invention of the present application contains at least an inorganic aggregate and a resin, and has a rugged surface with the inorganic aggregate exposed. As to the composition thereof, filler having a smaller particle size may be included together with the aggregate having a relatively large particle size. The filler may be same as or similar to the inorganic aggregate in terms of the kind thereof. As to the composition of the artificial stone, various kinds of additive components such as a deterioration-preventing agent for a resin to be contained, across-linking agent, a pigment, a luminous phosphorescent agent, a flame-retarding agent, and an antibacterial agent may be contained optionally.

According to the non-slipping artificial stone of the invention of the present application comprising the various kinds of compositions, in either case, the inorganic aggregate and the resin are contained. As the inorganic aggregate, one of or two or more kinds of natural stone powdery particles, ore powdery particles, ceramic particles, glass powdery particles, metal/alloy powders, or the like can be used. For example, a quartz, a silica, feldspar, an alumdum, a garnet, a dolomite, a glass, or the like can be presented a examples. Moreover, as the resin, various kinds of thermosetting resis may be used. One or two or more kinds of a methacrylate resin, an acrylate resin, an unsaturated polyester resin, an epoxy resin, or the like may be used.

Furthermore, according to the first aspect of the present application, the inorganic aggregate in the non-slipping artificial stone has a 25% or more and 75% or less volume percentage. Moreover, the non-slipping artificial stone of the present invention having the rugged surface has the average depth of the recessed groove part in the surface in a range of 0.02 mm or more and 1.0 mm or less.

In the case the volume percentage of the inorganic aggregate is less than 25%, the ratio of the inorganic aggregate disposed on the surface of the artificial stone is insufficient so that a predetermined depth in the surface recessed groove part cannot be obtained by a sufficient plane ratio in the entire surface, and thus the non-slipping characteristics cannot be satisfactory because the performance relating to the surface non-slipping property is close to the contained resin itself.

In contrast, in the case the volume percentage is more than 75%, the ratio of the inorganic aggregate disposed on the surface of the artificial stone is too high so that not only a sufficient non-slipping characteristic cannot be obtained but also the function of the resin as the binder is lowered, and thus a problem is involved in that the bending strength as the artificial stone is drastically lowered. Furthermore, the depth of the surface recessed groove part cannot be easily obtained in a predetermined range. From the above-mentioned viewpoints, the volume percentage of the inorganic aggregate is more preferably 35% or more and 65% or less.

According to the non-slipping artificial stone of the present invention has a 0.02 mm or more and 1.0 mm or less average depth of the surface recessed groove part. The average depth of the surface recessed groove part in this case is measured by moving a dial gauge having a contact needle linearly in an optional direction on the artificial stone rugged surface so as to have the measurement value as the average value. The average value can also be confirmed as the average value obtained by the surface measurement with a laser.

In the case the average depth of the surface recessed groove part is less than 0.02 mm, or in the case it is more than 1.0 mm, a preferable non-slipping performance cannot be obtained. According to the present invention, the average groove depth is more preferably 0.05 mm or more and 0.8 mm or less. Further preferably, it is 0.08 mm or more and 0.5 mm or less.

For example, the accompanying FIG. 1 shows a cross-section of a non-slipping artificial stone of the present invention by a metal microscope photograph by 50 times magnification. In FIG. 1, the maximum surface ruggedness groove depth is shown as H. The recessed groove average depth of the surface of the non-slipping artificial stone of the present invention is defined by the maximum depth (H) shown in FIG. 1, and the average value of the groove depth of the surface ruggedness including shallower grooves. The artificial stone of FIG. 1 is an example of using pulverized quartz with a 10 mm maximum particle size as the inorganic aggregate, and an MMA (methyl methacrylate) resin. The volume percentage of the aggregate is 54.17%, and the volume percentage of the MMA resin is 25.62%. As fine particle filler, 19.56% by volume of an aluminum hydroxide is included.

The average depth of the surface recessed groove of FIG. 1 is 0.2 mm. The slip resistance value C. S. R. (men's shoes) to be described later is 0.870 in the wet surface, and 0.621 in the oily surface, the C. S. R. B. (bare feet) is 1.435, and 1.142 in the soap surface so that the excellent non-slipping property is obtained.

Moreover, as another example, the relationship between the groove depth and the slip resistance value is shown for example as in the table 1.

TABLE 1

| Recessed groove average dept | Sliding resistance value C.S.R. (men's shoes) | | Sliding resistance value (bare feet) |
|---|---|---|---|
| (mm) | Wet surface | Oily surface | Wet surface |
| 0.01 | 0.742 | 0.312 | 1.382 |
| 0.02 | 0.802 | 0.354 | 1.543 |
| 0.05 | 0.812 | 0.413 | 1.566 |
| 0.08 | 0.849 | 0.501 | 1.557 |
| 0.10 | 0.857 | 0.510 | 1.542 |
| 0.20 | 0.883 | 0.648 | 1.541 |
| 0.50 | 0.878 | 0.625 | 1.540 |
| 0.80 | 0.863 | 0.602 | 1.462 |
| 1.0 | 0.821 | 0.512 | 1.408 |
| 1.2 | 0.765 | 0.483 | 1.356 |
| 1.4 | 0.685 | 0.407 | 1.126 |

The specimens in the table 1 differ only in terms of the recessed groove average depth, and have the same composition, maximum aggregate particle size and aggregate average particle size as follows.
<Main composition (% by volume)>
  Aggregate: quartz (41.0%)
  Resin: MMA resin (32.98%) p1 Filler: aluminum hydroxide (25.19%)
<Maximum aggregate particle size>
  2.5 mm
<Aggregate average particle size>
  0.5 mm As to the slip resistance value level of the table 1, in the case the excellent performance level peculiar to the non-slipping artificial stone of the present invention is defined to be a 0.8 or more C. S. R. in the wet surface, a 0.5 or more in the oily surface, and 1.4 or more C. S. R. B, from the results in the table 1, the recessed groove average depth is considered to be 0.02 mm to 1.0 mm, more preferably 0.05 to 0.8 mm, and further preferably 0.08 mm to 0.5 mm.

Then, according to the present invention, in order to improve the non-slipping characteristic, as shown in FIG. 1, it is preferable that the inorganic aggregate exposed in the surface has a sharp corner part. For example, with the same composition ratio, in the case pulverized quartz, abraded quartz, river sands, and glass beads (spherical) are used each as the inorganic aggregate, the slip resistance was lowered successively. It was confirmed that in the case of the glass beads (spherical), it is lowered to 60% or less with respect to the pulverized quartz, and furthermore, to 50% or less.

For example, in the case of a 0.2 mm average depth of the surface recessed groove with the same maximum aggregate size and aggregate volume percentage, the slip resistance value C. S. R (men's shoes) is charged as shown in the following table 2.

TABLE 2

| Aggregate | C.S.R. (wet surface) | C.S.R. (oily surface) |
|---|---|---|
| Pulverized quartz | 1.541 | 1.262 |
| Abraded quartz | 1.493 | 1.163 |
| River sands | 1.362 | 1.126 |
| Glass beads (spherical) | 0.927 | 0.673 |

It was learned that the existence of the sharp corner part of the inorganic aggregate is important for the non-slipping performance.

As to the above-mentioned sharp corner part, for example, a radius of curvature of 1 mm or less can be considered.

Moreover, for the non-slipping artificial stone of the present invention, it is preferable to take into consideration the maximum particle size of the inorganic aggregate.

The maximum particle size of the inorganic aggregate in the present invention is considered to be first ½ or less of the plate thickness at the time of placing and hardening in a mold of the artificial composition because an artificial stone having desired strength, shape and size can hardly be produced in the case the aggregate of a size more than ½ of the plate thickness is included so as not to realize the non-slipping artificial stone of the present invention.

In the case the plate thickness at the time of placing and hardening is ½ or less, the aggregate maximum particle size is determined in consideration of the application of the non-slipping artificial stone, the performance to be desired, or the like. The maximum particle size is important in terms of the relationship with respect to the non-slipping performance of the artificial stone used for the bathroom floor surface, the poolside, or the like to be contacted with bare feet.

This is because one with a smaller maximum particle size provides a higher slip resistance in the wet surface and the soap-wet surface. Moreover, one with a larger maximum particle size provides smaller risk of generation of a graze.

For example, compared with the non-slipping artificial stone (maximum particle size 10 mm of the inorganic aggregate) with the cross-section shown in FIG. 1, even in the case the kind and the volume percentage of the inorganic aggregate, the resin (MMA), and the surface recessed groove average depth (0.2 mm) are same, it is confirmed that the non-slipping performances differ. Examples thereof are shown in the table 3.

TABLE 3

| Maximum aggregate particle size (mm) | Sliding resistance value C.S.R. (men's shoes) | | Sliding resistance value C.S.R.B. (bare feet) | | Grazing property G value (kgf) |
|---|---|---|---|---|---|
| | Wet surface | Oily surface | Wet surface | Soap surface | |
| 10 | 0.870 | 0.621 | 1.435 | 1.142 | 37.73 |
| 5 | 0.871 | 0.598 | 1.453 | 1.184 | 38.46 |
| 2.5 | 0.874 | 0.633 | 1.502 | 1.225 | 39.27 |
| 1.2 | 0.871 | 0.615 | 1.532 | 1.297 | 41.90 |
| 0.6 | 0.870 | 0.605 | 1.545 | 1.350 | 42.10 |
| 0.3 | 0.871 | 0.595 | 1.575 | 1.400 | 42.40 |
| 0.15 | 0.865 | 0.580 | 1.535 | 1.250 | 41.80 |
| 0.075 | 0.501 | 0.205 | 0.705 | 0.410 | 20.10 |

In the case of the slip resistance value (C. S. R.) in the case of the hard shoe soles, a large change is not observed essentially depending on the difference of the aggregate maximum particle sizes in a range of 10 mm or less to about 0.3 mm, but in the case of the slip resistance value (C. S. R. B.) in the case of the bare feet, the slip resistance is increased in this range with a smaller aggregate maximum particle size so that it is learned that the non-slipping performance is further improved. In contrast, as to the grazing property evaluated as the tensile G value, a larger value denotes a higher risk of generation of a graze. From the result examples in the table 2, it is learned that a smaller maximum particle size to about 0.15 mm provides the excellent non-slipping performance as the artificial stone used for the application in contact with the bare feet, but a problem is involved in terms of generation of a graze.

From the above-mentioned, depending on the application, that is, in the case of the contact with the hard shoe soles and in the case of the contact with the bare feet, the mechanism of providing the non-slipping characteristics differ, and the maximum particle size of the inorganic aggregate is an influencing factor to the mechanism.

In the case of an aggregate having a smaller maximum particle size, the existence ratio per a unit plane of the recessed groove part in the rugged surface of the artificial stone is considered to be large. It is considered that in the case of the bare feet, the soft skin of the soles of the feet are closely contacted with the fine recessed groove parts, however, in the case of the hard shoe soles, such an adhesion is not generated.

In either case, by taking the above-mentioned in consideration, according to the non-slipping artificial stone of the present invention, a non-slipping artificial stone can be designed according to the application.

According to the present invention, in general, the inorganic aggregate maximum particle size is preferably 0.15 mm or more and 10 mm or less as it is learned from the table 3.

In the case it is too small to be less than 0.15 mm, not only the basic functions as the aggregate, that is, the strength or the surface hardness as the artificial stone, the deep natural stone feeling, or the like are lost and problems of difficulty in homogeneous dispersion at the time of the production, or the like are generated, but also the slip resistance value in the case of the hard shoe soles C. S. R. is drastically lowered as well as the slip resistance value in the case of the bare feet C. S. R. B. is remarkably lowered. The non-slipping performance cannot be satisfactory.

In contrast, although it is not shown in the table 3, also in the case of a large particle size more than a 10 mm maximum aggregate particle size, the slip resistance value is lowered so as not to practically satisfactory. For example, in the case of a 13 mm maximum aggregate particle size, the c. s. R. (men's shoes) is 0.75 in the wet surface and 0.32 in the oily surface. In the case of the C. S. R. B. (bare feet), it is 1.281 in the wet surface and 0.545 in the soap surface.

Moreover, as to the inorganic aggregate, it is desired that the hardness thereof is taken into consideration. In general, in the present invention, those having 5 or more Mohs hardness can be used preferably as the inorganic aggregate. As those having a 5 or more Mohs hardness, for example, a quartz having a 7 Mohs hardness, feldspar having a 6 Mohs hardness, a garnet having a 8 Mohs hardness, an alumnus having a 9 Mohs hardness, or the like can be presented.

It is confirmed that those having a less than 5 Mohs hardness have a slightly lower initial slip resistance value and much wear. For example, comparison of the non-slipping performance and the wear amount before and after the artificial stone wear test (JIS A 1451) is shown in the following table 4.

TABLE 4

| Aggregate (Mohs hardness) | Sliding resistance value C.S.R. (men's shoes) | | | | Wear amount (mm) |
|---|---|---|---|---|---|
| | Wet surface | | Oily surface | | |
| | Before | After | Before | After | |
| Quartz (7) | 0.883 | 0.803 | 0.648 | 0.430 | 0.18 |
| Calcium carbonate (3) | 0.874 | 0.730 | 0.551 | 0.333 | 0.38 |
| Fluorite (4) | 0.881 | 0.765 | 0.591 | 0.403 | 0.28 |

According to the present invention, an artificial stone having a non-slipping performance not expected in the conventional artificial stones can be provided. Here, evaluation of the "non-slipping performance" will be explained.

As to the evaluation of the non-slipping performance, the slipping performance of the road for running a vehicle wheel, or the like has frequently been discussed conventionally. However, the evaluation standard for the surface non-slipping performance of the construction materials or various kinds of structures has not been established yet, nor there is no integral international common standard in the present situation.

As the evaluation method for the non-slipping performance, the BPN (British pendulum number) (ASTM E 303), which has been discussed with the road for running a vehicle wheel, or the like used as the main subject is known. However, the BPN is not appropriate for evaluation of the non-slipping performance of the floor surface or the road for walking with shoes or bare feet, or the like.

However, it can be taken into consideration as the internationally common guideline.

As to the BPN, in general, it is considered to be slippery in the wet state by less than 60 in the case of running and less than 40 in the case of walking.

In contrast, in our country (Japan), as the guideline for difficulty in slipping for the floor materials, the "slip resistance coefficient (C. S. R.: Coefficient of Slip Resistance)" measured by the "slipping test method (oblique tension type) for the floor materials" defined in the annex literature of the JISA 5705 (vinyl based floor material) can be referred to. Also in this case there still remain the points to be discussed, however, it should be considered as the evaluation guideline in the present situation.

Then, according to the non-slipping artificial stone of the invention of the present application, together with the above-mentioned BPN, the C. S. R. (JIS A 5705, JIS A 1454) are used as the reference guideline. As to the C. S. R., in order to enable the evaluation with higher accuracy, the non-slipping performance is measured with a tester "O-Y.PSM" discussed closely by the professor ONO Hidetetsu et al. of Tokyo Institute of Technology Department of Architecture and Building Engineering, and established as a testing apparatus.

Figure 2:
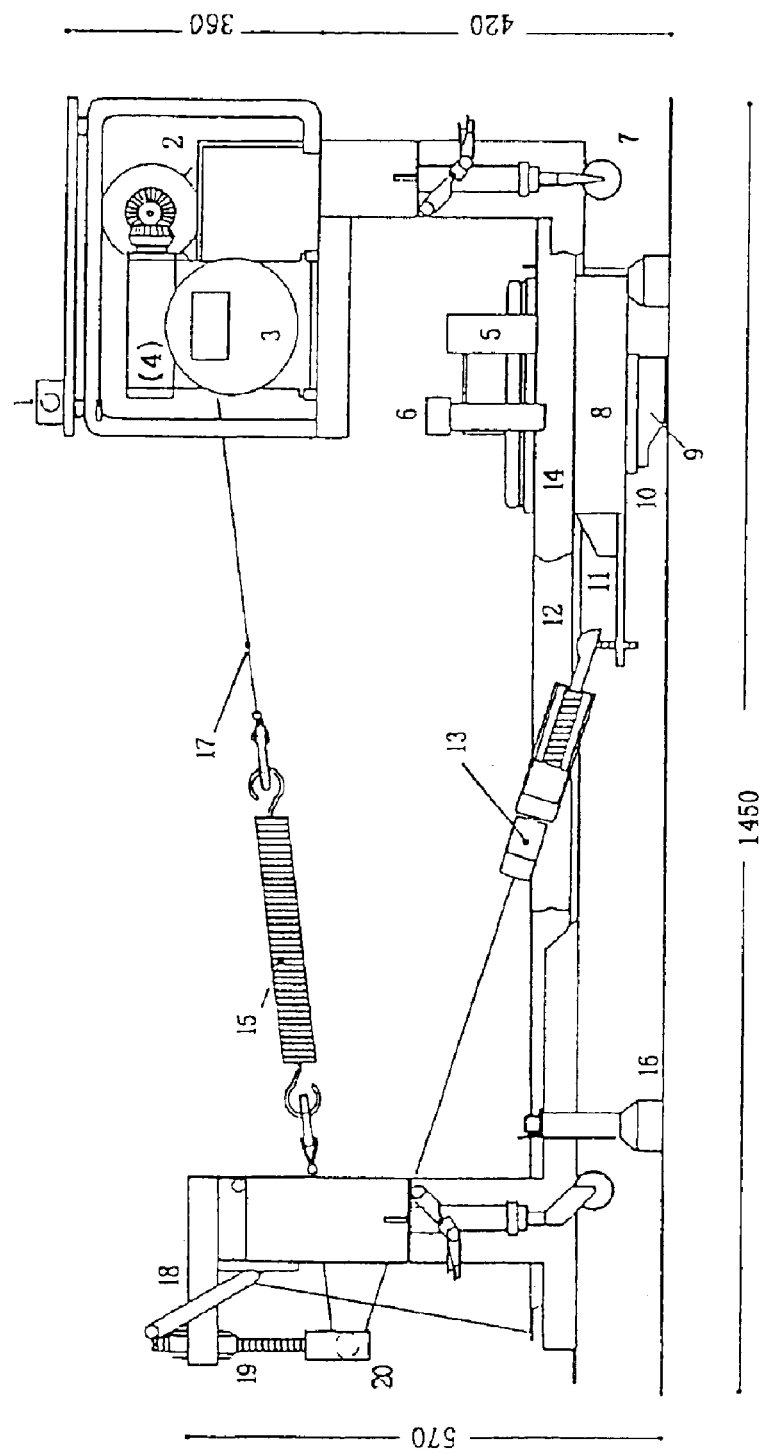
FIG. 2 is a diagram showing the configuration of a slip tester "O-Y.PSM".

The configuration o the slip tester "O-Y.PSM" is as shown in FIG. 2. In the case of wearing shoes, the sole of the shoe to be used actually such as a men's shoe is mounted on a slip piece seat (9), and the tensile load/time curve is measured with a placed weight (8) of 80 kg at the time of pulling with predetermined introduction time and load speed.

The numerals shown in FIG. 2 represent the following.

TABLE 5

Figure 3:
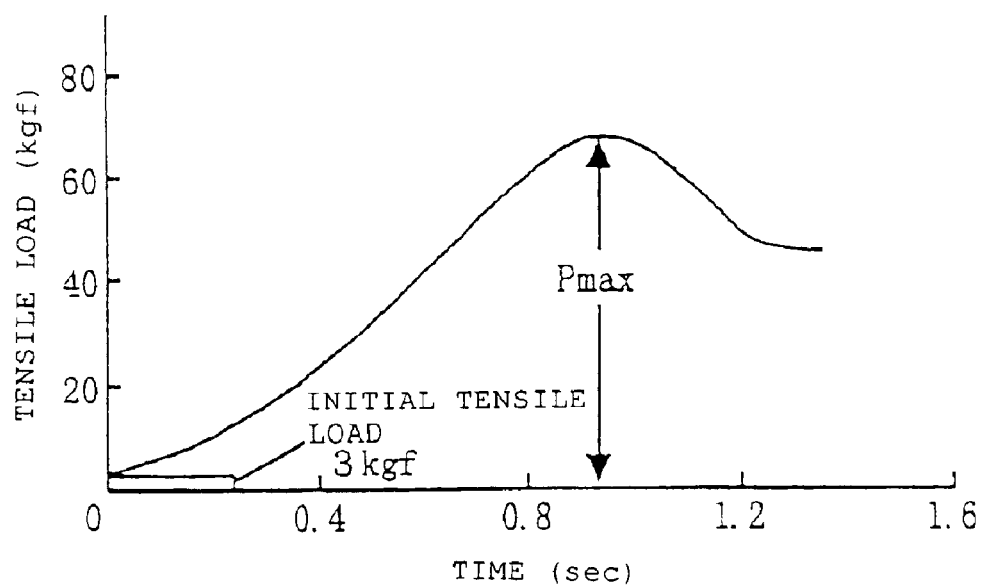
FIG. 3 is a schematic graph of a tensile load/time curve for calculating the C. S. R.

1 Main switch
2 Constant speed motor
3 Speed reducing device
4 Wire winding device
5 Start switch
6 Stop switch
7 Moving wheel
8 Weight
9 Slip piece seat
10 Slip piece seat receipt
11 Universal joint
12 Initial load adjusting device
13 Load converting device
14 Guide rail
15 Tensile load speed adjusting device
16 Fixing leg TABLE 5-continued 17 Wire
18 Elevator
19 Tensile angel adjusting device
20 Pulley An example of the tensile load/time curve is as shown in FIG. 3. From FIG. 3, the maximum tensile load (Pmax) is found out, and the slip resistance value (C. S. R.) is calculated by the below-mentioned formula for evaluation of slip of the specimen.

$$C.\ S.\ R. = P\text{max (kgf)}/80\text{(kgf)}$$

Since slip is changed largely depending on water, water and dusts (muddy water), oil, or the like existing on the surface so that measurement should be carried out with these factors considered.

Moreover, the JIS A 1454 defines the standard slip piece and the substances existing on the surface.

In the case of a C. S. R. hard sole men's shoe, in general, a guideline is provided that less than 0.45 is slippery for various kinds of floor materials regardless of the existing substances.

For measurement of slide resistance value C. S. R., for example, the flowing research paper by professor Ono, et al. can be referred to.

TABLE 6

ONO Hidetetsu, MIYAGI Munekazu, KAWADA Akisumi, YOSHIOKA Tan: article reports by Architectural Institute of Japan vol. 321, 1–7 (November, 1992)
ONO Hidetetsu: article reports by Architectural Institute of Japan vol. 333, 1–7 (November, 1993)
ONO Hidetetsu, KAWADA Akisumi, MIYAGI Munekazu, KAWAMURA Kiyoshi, KONISHI Toshimasa, MIKAMI Takamasa, HASHIDA Hiroshi, YOSHIOKA Tan: article reports by Architectural Institute of Japan vol. 346, 1–8 (December, 1984)
ONO Hidetetsu, SUDA Taku, TAKEDA Kiyoshi: structure related article reports by Architectural Institute of Japan vol. 356, 1–8 (October, 1985)
ONO Hidetetsu, HASHIDA Hiroshi, YOKOYAMA Hiroshi: structure related article reports by Architectural Institute of Japan vol. 359, 1–9 (January, 1986)
ONO Hidetetsu, MIKAMI Takamasa, TAKAGI Tadashi, YOKOYAMA Hiroshi, KITAYAMA Masaru, Takahashi Hiroki: structure related article reports by Architectural Institute of Japan vol. 450, 7–14 (August, 1993)

Figure 4:
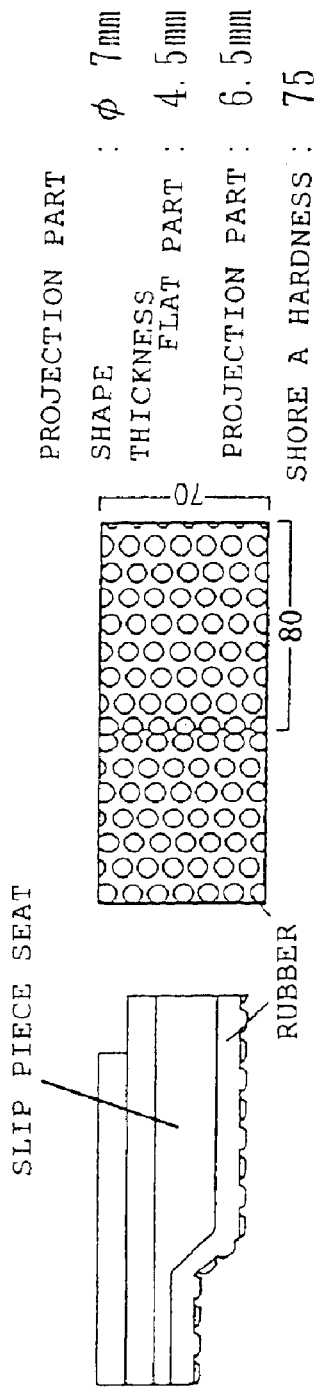
FIG. 4 is a diagram showing a slip test piece for evaluating the C. S. R. B.

Moreover, for measurement of slip with the bare feet, the tensile load/time curve is measured using a slip piece shown in FIG. 4.

Figure 5:
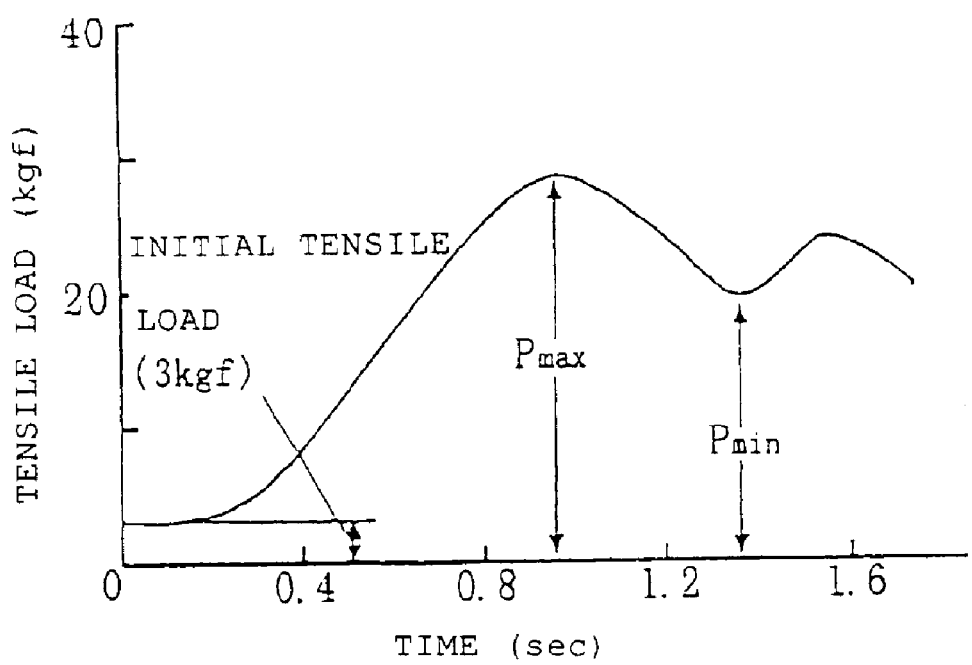
FIG. 5 is a schematic graph of a tensile load/time curve for calculating the C. S. R. B.

An example of the tensile load/time curve is as shown in FIG. 5. From FIG. 5, the maximum load (Pmax) and the initial recess part load (Pmin) are found out, and the "slip resistance value (C. S. R. B.: Coefficient of Slip Resistance bath)" is calculated by the below-mentioned formula for evaluation of slip of the specimen.

$$C.\ S.\ R.\ B. = (P\text{max (kgf)}/80\text{(kgf)}) + (P\text{min (kgf)}/80\text{(kgf)})$$

The C. S. R. B. is considered to be a measurement evaluation method based on the JIS A 5705.

Measurement is carried out with a liquid substance such as water, soap, oil, or the like existing on the floor.

As to the C. S. R. B. bare feet, in general, it is considered to be slippery by less than 0.8 for various kinds of the floor materials regardless of the existing substance.

Figure 6:
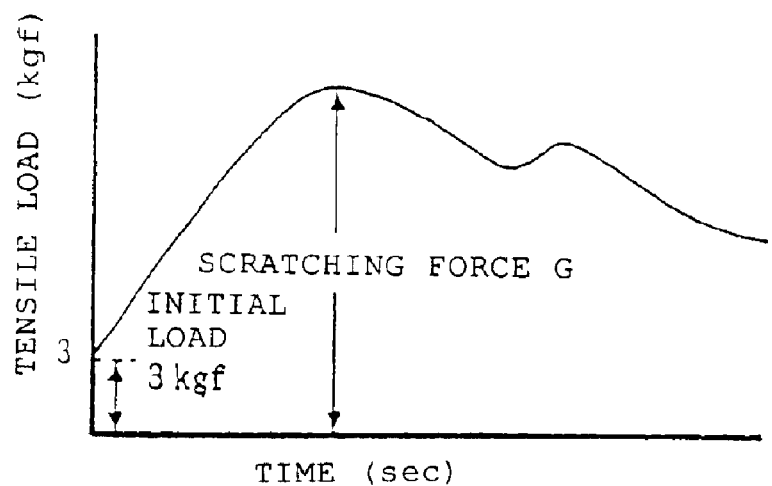
FIG. 6 is a schematic graph showing an example of a tensile load/time curve and a scratching force for measuring the scratching force.

Moreover, in the case of the contact with the bare feet, the degree of generation of a graze should be taken into consideration. Then, with the above-mentioned tester, a foamed rubber with a 35 shore A hardness and a 3 mm thickness is mounted to the slide piece seat (10)) of the tester, furthermore, baby powder is applied on the rubber surface by 2 g/m² for measuring the scratching force G (kgf) (see FIG. 6) with the placed weight 40 kgf condition. The floor surface ruggedness viewed from the point of graze generation can be evaluated by the scratching force G (kgf). With a larger scratching force G value, a graze can easily be generated.

As to the G value representing easiness of the graze generation in general is preferably 45 kgf or less.

As to the slip test in the case of the bare feet, the following research papers by the professor Ono et al. can be referred to.

TABLE 7

ONO Hidetetsu, UENO Seiji, YOKOYAMA Hiroshi, OHNO Ryuzo, MIKAMI Takamasa: structure related article reports by Architectural Institute of Japan vol. 384, 26–33 (February, 1988)
ONO Hidetetsu, MIKAMI Takamasa, OHNO Ryuzo, YOKOYAMA Hiroshi, UENO Seiji, TAKAGI Tadashi: structure related article reports by Architectural Institute of Japan vol. 387, 1–7 (May, 1988)
ONO Hidetetsu, MIKAMI Takamasa, NAGATA Mayumi: structure related article reports by Architectural Institute of Japan vol. 392, 10–17 (October, 1988)

The C. S. R. and the C. S. R. B. and the scratching force (graze property) in the above-mentioned tables 1 to 4 are evaluated by the above-mentioned viewpoints and methods.

According to a large number of the prior case, the C. S. R. and the C. S. R. B. have been measured for various kinds of the floor materials. As to the C. S. R. (hard sole shoes) in the wet state, that is, in the state with water scattered, it is less than 0.6 in either case of a stone material, a mortar, a concrete and a ceramic tile, and even in the case of a member with a non-slipping performance, it is merely less than 0.8. The same is applied for the case of the artificial stones. The C. S. R. B. in the case of the bare feet of the conventional non-slipping artificial stone in the wet state is merely less than 1.3.

In such a present situation, the invention of the present application provides an artificial stone have the excellent non-slipping property:

(1) A non-slipping artificial stone having a 0.8 or more slip resistance value C. S. R. in the case of the hard sole men's shoes in the wet surface (water scattered state)
(2) A non-slipping artificial stone having a 0.45 or more slip resistance value C. S. R. in the case of the hard sole men's shoes in the oily surface
(3) A non-slipping artificial stone having a 1.4 or more slip resistance value C. S. R. B. in the case of the bare feet in the wet surface
(4) A non-slipping artificial stone having a 0.8 or more slip resistance value C. S. R. B. in the case of the bare feet in the soap surface.

Here, the wet surface denotes the water-scattered state as mentioned above. More specifically, it is understood as the state with distilled water sufficiently scattered. Moreover, for the oily surface, it is the state with an edible rapeseed oil (JAS plant oils and fats article No. 32) scattered by 40 g/m². The soap surface is the state with a liquid soap undistilled solution (body soap) sufficiently scattered.

Then, according to the invention of the present application, concerning the international standard BPN, a non-slipping artificial stone having the slip resistance value BPN (ASTM E303) of 65 or more in the wet surface, and 20 or more in the oily surface will also be provided.

For example, according to comparison of a non-slipping artificial stone of the present invention with the following specification; that is, an artificial stone with a quartz aggregate (41.0 vol %) as the main composition, an MMA resin (32.98 vol %), and a filler aluminum hydroxide (25.19 vol %), having a 2.5 mm maximum aggregate particle size, and a 0.2 mm surface recessed groove average depth, and a commercially available floor material, the non-slipping performance difference as shown in the following table 8 can be grasped.

TABLE 8

| Performance | | the invention | product A | product B |
|---|---|---|---|---|
| BPN | Dry | 71 | 79 | 85 |
| | Wet | 68 | 22 | 54 |
| | Soap | 30 | 15 | 18 |
| | Oil | 37 | 10 | 16 |
| C.S.R. | Wet | 0.883 | 0.782 | 0.741 |
| (men's shoes) | Oil | 0.648 | 0.268 | 0.284 |
| C.S.R.B | Wet | 1.541 | 0.946 | 1.001 |
| (bare feet) | Soap | 1.262 | 0.332 | 0.475 |

Commercially available product A: produced by Gale Corp. (Germany), a tile for a pool
Commercially available product B: produced by Inax Corp.

According to the present invention, as it is apparent from the table 8, a product having the excellent non-slipping performance of 60 or more in the BPN wet surface and 20 or more the oily surface can be provided.

From the table 8, it is also learned that the BPN performance difference is apparent also as the difference in the C. S. R. and the C. S. R. B.

Then, the present invention provides a non-slipping artificial stone having the degree surface contact angle on average in the case of the distilled water of 45 to 75, preferably 55 to 72. It is apparent also by the following table 9 that the contact angle is related to the non-slipping performance.

TABLE 9

| Specimen | Distilled water average contact angle (degree) | C.S.R. (men's shoes) Wet surface | Body soap Average contact angle (degree) | C.S.R.B. (bare feet) Soap surface |
|---|---|---|---|---|
| Product of the invention A | 63 | 0.863 | 0 | 1.256 |
| Product of the invention B | 55 | 0.883 | 0 | 1.262 |
| Product of the invention C | 70 | 0.812 | 0 | 1.122 |
| Commercially available product B (Table 8) | 103 | 0.741 | 24 | 0.475 |
| Commercially available resin plate (polyester) | 74 | Unmeasurable | 19 | Unmeasurable |

(1) The products of the present invention includes a quartz aggregate (45 vol %) as the main composition, an MMA resin (29 vol %), and an aluminum hydroxide (24 vol %), and has a 3 mm maximum aggregate particle size. However, the surface recessed groove average depth is 0.8 mm, 0.2 mm, 0.05 mm, respectively.
(2) As the body soap, "Biore JB (whole body cleanser)" produced by Kao Corp. is used.
(3) "Unmeasurable" denotes inability of measurement as a numerical value due to too large slipping.

It is learned that the product of the present invention has a smaller contact angle, that is, the so-called excellent wet ability.

For the artificial stone of the present invention having the above-mentioned excellent non-slipping performance, the composition can be varied as mentioned above, and further the same is applied to the production method.

As to the composition, it is considered that together with the above-mentioned inorganic aggregate and resin, the filler material and the other functional components, and the slight amount components can optionally be used in view of the strength or wear resistance as the artificial stone, the tone, the flame resistance, and the various functions.

The inorganic aggregate is prepared so as to have the volume percentage by 25% or more and 75% or less. The inorganic aggregate in this case is desired to have the maximum particle size by ½ or less with respect to the plate thickness at the time of placing and hardening as mentioned above. However, it is needless to say that the inorganic aggregate can be provided as a mixture of various kinds of particle sizes with a particle size distribution.

Practically, it is preferable to use one having a particle size larger than 36 mesh (Tayler standard). Then, the inorganic aggregate is used preferably as one with a particle size distribution of closest packing well known in the field of the concrete engineering, or in the vicinity thereof. In particular, the closest packing should be taken into consideration in the case of improving the non-slipping property of the floor material, or the like to be contacted with the bare feet as one having a smaller maximum aggregate particle size.

The closest packing composition of the inorganic aggregate in the present invention can be considered as one having the average particle size in relation to the maximum aggregate particle size as shown in the following table 10.

TABLE 10

| Maximum aggregate particle size (mm) | Average aggregate particle size (mm) |
| --- | --- |
| 10 | 1 |
| 5 | 0.7 |
| 2.5 | 0.5 |
| 1.2 | 0.4 |

In the case of obtaining an artificial stone, the tone and the design should naturally be taken into consideration. The granite and the marble are frequently be targeted owing to difficulty in obtainment of the natural product and beautiful color and glossiness. In this case, the color and glossiness are the important theme determining the value of the granite and the marble. According to the natural granite or marble, there are a large number of colors from totally black to white, or red as well as the degree thereof differs for the same color.

In the case of providing a color to the various kinds of the artificial stones, for example, for obtaining a black one, only black powdery particles of a natural stone, or the like may be used, however, in order to obtain a product of an intermediate tone, the productivity involves a problem. Moreover, even in the case a color can be provided, it is not easy to provide the glossiness peculiar to the marble.

Even in the case of providing a color using a dye or a pigment, it has conventionally been difficult to provide the glossiness or the depth.

In contrast, according to the artificial stone of the present invention, a transparent inorganic aggregate can be used. For example, in the case of obtaining a granite-like or marble-like product with the glossiness, an inorganic aggregate obtained by pulverizing quartz based natural stone, a glass; molten silica can be used.

The inorganic aggregate obtained by pulverizing the quartz based natural stone is in many cases colorless and transparent. Even in the case it has a color, it is not very strong, or in the case it is not transparent, most of them still have the transparency to some extent.

By using the aggregate, the color of the product artificial stone can be controlled as well as the color is provided with the depth and the glossiness owing to the existence of the transparent quartz based fine grain component.

Moreover, according to the non-slipping artificial stone of the present invention, together with the inorganic aggregate material, a filler with fine particles much smaller than that, for example, a filler material having the average particle size of 30 $\mu$m or more and 70 $\mu$m or less can be used preferably. As the filler material, various kinds thereof including natural and artificial can be presented. For example, a calcium carbonate, an aluminum hydroxide, or the like are preferable. These inorganic fillers have a particle size much smaller than the above-mentioned aggregate so that they can enter between the inorganic aggregates so as to be disposed for filling the space between the particles for contributing to obtainment of the natures of the artificial stone to be obtained, such as the hardness, the flexibility and the surface non-slipping property. The volume ratio of the inorganic aggregate and the filler is in general, preferably: inorganic aggregate/filler material=0.5 to 5. Furthermore, it is preferably in a range of 1 to 4.

Moreover, as a part of the components of the filler, for tone adjustment, a component such as a manganese dioxide, a titanium dioxide, a zirconium silicate and an iron oxide can be included, for providing a function of the nocturnal property or the fluorescent property, a color accumulating material such as a strontium aluminates or an inorganic fluorescent material of various kinds of oxides can be included, and for providing a flame retardant property, a component such as an antimony trioxide, a boron compound and a bromine component can be added.

Moreover, an inorganic antibacterial agent can be included as well. For example, an antibacterial non-slipping artificial stone is useful for the floor, the wall, the handrail, or the like of the bathroom, the toilet, or the like. It is also useful for the medical institution, the food processing institution, or the like.

As the inorganic antibacterial agents, for example, silver based, zinc based, copper based inorganic materials can be presented.

As the resins, as mentioned above, it can be selected from a wide range of the thermosetting resins.

For example, an acrylic resin, a methacrylic resin, an unsaturated polyester resin, or the like can be presented. In particular, a methacrylic resin, an epoxy resin, a mixture thereof, or a copolymer rain thereof, or the like can be presented preferably.

To these resins, for adjustment of the tone, an azo based or phthalocyanine based organic pigment or dye may be included.

Moreover, a light stabilizing agent, an organic flame retardant agent, or the like may be included.

The resin component contributes to containing the inorganic aggregate and the filler material of the natural stone, or the like as the component for forming the skeleton of the artificial stone so as to bond the entirety so that it provides the function of providing the elasticity or the tensile strength to the product at the time of completing the artificial stone.

As to the resin component, the volume percentage can be provided to about 70%, however, in consideration of the strength as the artificial stone, the durability, the natural stone-like external appearance and the color, or the like, practically it is preferably 25 vol % or more and 35 vol % or less.

In the case the resin component is too much, the artificial stone product becomes plastic-like so as to be a product having only appearance and the name of the artificial stone. Moreover, by excessively reducing the resin component, even though it may increase the external appearance property of the product close to the natural color, the product becomes vulnerable so as not to be usable. The non-slipping property can hardly be obtained as well.

As to the resin component, according to the present invention, an artificial stone having the desired excellent non-slipping performance can be realized with various kinds of resins. For the artificial stones for the applications required to have the hardness and the weather resistance, the chemical resistance, the hardness, the wear resistance, the transparency, the tone depth, or the like, a methacrylic resin, in particular, an MMA (methyl methacrylate) can be used preferably as the main component.

Moreover, as to the artificial stone main composition of the above-mentioned inorganic aggregate and the inorganic filler material, and the resin, a high hardness soft composite material already proposed by the present inventors can be used as the non-slipping artificial stone.

That's, a non-slipping artificial stone having the surface hardness of 400 or more in the Vickers hardness (JIS Z 2244) and the radius of curvature capable of having the bending process without breakage in the case of a 3 to 15 mm thickness plate material of R 25 mm or more can be provided.

This can be provided with the inorganic component including the inorganic aggregate by 50 vol % or more with respect to the entirety, and the organic component such as the resin by less than 50 vol %. Then, the main component of the organic component can be a methacrylate. More specifically, a hardened modified MMA resin of a polymethyl methacrylate (PMMA), and one or more kinds of a methyl methacrylate (MMA) monomer, a 2-ethyl hexymethacrylate monomer, a 2-ethyl hexyl acrylate monomer, a 2-ethyl pentyl methacrylate monomer, a butyl methacrylate monomer and a cyclohexyl methacrylate monomer can be presented as an example.

The table 11 shows the non-slipping performance of the artificial stone in the case of the various kinds of the resins.

TABLE 11

| Resin | C.S.R. (men's shoes) | | C.S.R.B. (bare feet) | |
|---|---|---|---|---|
| | Wet surface | Oily surface | Wet surface | Soap surface |
| MMA resin (our company) | 0.875 | 0.625 | 1.587 | 1.282 |
| Unsaturated polyester resin ("FG208" produced by Dainippon Ink and Chemicals, Incorporated) | 0.862 | 0.612 | 1.586 | 1.250 |
| Modified MMA resin ("XD7005" produced by Mitsubishi Rayon Co., Ltd.) | 0.863 | 0.583 | 1.412 | 1.121 |

In either case, the non-slipping performance of an artificial stone using a quartz having a 2.5 mm aggregate maximum particle size, including 50 vol % of the aggregate, 25 vol % of the resin, and 22 vol % of the filler material aluminum hydroxide as the main component with a 0.8 mm surface recessed groove average depth is shown. In the case of the modified MMA resin, although the level is lowered with respect to the case of the MMA resin, it is learned that a good non-slipping performance can be obtained. Furthermore, in this case, an artificial stone plate having a high hardness and a flexibility reflecting the hardness of the inorganic aggregate can be obtained.

According to the present invention, the ratio of the inorganic aggregate and the resin is defined by the volume % instead of the weight % for the reason based on the knowledge that the actual form ratio comprising the artificial stone and the surface thereof is an important factor according to the non-slipping artificial stone. The characteristic as a three-dimensional solid is a desired non-slipping performance, and the indispensable factor as the artificial stone configuration is the volume percentage. Of course it can be represented by the volume ratio by the specific gravity conversion, however, it is not essential as the definition of the present invention.

Furthermore, as to the explanation of the composition of the artificial stone, according to the non-slipping artificial stone of the present invention, it may be one having a part or the entirety of the above-mentioned inorganic aggregate as a transparent particle, with the particle or a small lump thereof covered with an inorganic substance or an organic substance.

Such an operation of covering the transparent inorganic aggregate can be realized by covering and hardening a resin on the surface of the transparent particle, covering with an inorganic substance such as a water glass, a glaze for a pottery, a material accumulating type fine particle, and an inorganic antibacterial material by baking, or the like. In either case, the surface of the transparent particles can be covered by several $\mu$m to several tens $\mu$m, for example 5 to 50 $\mu$m more preferably about 20 to 30 $\mu$m. Further specifically, the inorganic covering can be provided by for example using an acrylic based resin, an unsaturated polyester based resin composition, heating to about 150 to 300° C., or directing a light for covering and hardening the resin composition on the particle surface, or by using a water glass, a glaze, a luminous material fine particle, or the like, and baking at a high temperature of about 800 to 1,100° C.

By providing the covering layer containing a coloring material, such as a pigment and a dye, a unique tone with the depth and the glossiness can be provided.

It is effective to coat a glaze for coloring a pottery, or the like onto a particle of a natural transparent inorganic aggregate, baking the same so as to have a particle of a desired color, and use the same. According to the method, not only a certain color can be provided but also selection range can be widened.

By using the same one as pulverized quartz based natural stone to be used as an inorganic aggregate, with a glaze coated and baked, in the case of a black or red color, there is no concern in terms of the color reproductivity. The reproduced color can be reproduced completely not only in terms of the color itself but also the glossiness and the tone.

The covering dramatically improves the affinity of the artificial stone aggregate with respect to the entire structure.

Further importantly, since the above-mentioned transparent natural stone, or the like is used for the aggregate with the above-mentioned hard covering is provided on the surface thereof, the covering layer is partially broken in the case the artificial stone surface is polished. Thereby, the partially exposed inorganic transparent aggregate particles and the covering layer surface structure in the vicinity thereof provides a unique effect to the light reflection.

That is, a light is incident on the transparent aggregate, reflected by the covering layer in the vicinity thereof, and reflected by passing through again the transparent aggregate. Such a light transmission and reflection phenomenon is essentially different from the reflection only on the surface of the conventional artificial stone, and it provides a unique deep feeling to the artificial stone of the present invention.

In the case such a covering layer is made of a fluorescent material having a nocturnal and light emitting property, or the like, the light emission can provides a higher luminance and the persistence.

A transparent aggregate having the above-mentioned covering layer can be provided by the ratio of in general 10 to 100 vol % with respect to the total amount of the inorganic aggregate to be included.

The invention of the present application provides a non-slipping artificial stone for example as the above-mentioned artificial stone, with the surface provided with the water jet process by cutting or dividing into a predetermined shape or thickness, or without cutting or dividing after placing and hardening the artificial stone composition containing the inorganic aggregate and the resin in a shaping mold.

Moreover, a non-slipping artificial stone Provided with the polish process such as a water polish and a mirror surface polish provided before the water jet process can be provided as well.

The placing and hardening operation can be executed as the mold injecting shaping, the compression shaping, the continuous belt shaping, or the like.

For example, as to the compression shaping, the compression shaping can be carried out by introducing a material including the inorganic aggregate and the filler material, and the resin component preliminarily by the amounts necessary for the composition after completing the shaping to a lower receiving mold as a horizontal mold frame, placing an upper mold, and pressuring the same by for example a 5 to 100 $kgf/cm^2$ surface pressure. In the shaping operation, it is heated to about a 80 to 180° C. temperature for about 5 minutes to several hours at the time of compression.

Moreover, in the compression shaping while heating, it is also possible to improve the flow ability of the above-mentioned material in the mold by applying the vibration to the mold frame together with pressuring.

Of course the non-slipping artificial stone according to the present invention is not limited to a flat plate-like shape as the actual product. It may be a projection-like shape, or a shape having a projection on the surface for visually handicapped people, or it may have a shape with a grade difference. In addition thereto, various kinds of shaped can be considered.

From the viewpoint of the disaster prevention, it is needless to say that using a luminous material for guiding a dark field of view as an artificial stone component can provide a guiding sign. Such a compression shaping method is provides the mass production effect as a shaping method for a relatively simple shape such as a flat plate compact, moreover, it is excellent in terms of the economy owing to little material loss.

Then, according to the present invention, it is possible to provide the process on the compact surface after shaping for providing the desired non-slipping performance to the exposed resin surface.

As a method therefore, for example, a selective elimination method for a resin can be adopted. As the method, for example, it is effective to jetting high-pressure water to the surface of the compact after releasing form the shaping mold for applying the base surface process. It is the above-mentioned water jet process.

At the time of the water jet process, the various conditions such as the water pressure, the jetting nozzle size, and the distance between the material surface and the nozzle jetting opening are selected for forming a predetermined surface groove depth on the surface evenly according to the surface hardness and the surface strength of the material as the processing subject. It is not limited, but for example, a water pressure of about 100 to 1,500 $kgf/cm^2$ can be used in general for a nozzle height of about 5 to 50 mm.

The nozzle and the system thereof for jetting high-pressure water are not particularly limited. Various kinds thereof can be adopted.

According to the water jet process, roughing can be realized so that an artificial stone having the non-slipping property and the deep feeling can be produced. Furthermore, what should be stressed in the present invention is that the color of the artificial stone is not made opaque by the water jet process.

The artificial stone surface cutting amount by the water jet process depends on the kind of the inorganic aggregate and the resin, the composition ratio thereof, the shaping condition, or the like, and thus it can be determined optionally with these points taken into consideration. From the viewpoint that the surface recessed groove depth in general is 0.02 to 1.0 mm, it is about 10 $cm^3/m^2$ or more. For example, in the case of an artificial stone using quartz as the inorganic aggregate and the MMA resin, in order to have a 0.05 mm surface recessed groove depth average, it is about 30 to 38 $cm^3/$, and in order to have a 0.2 mm average depth, it is about 80 to 92 $cm^3/m^2$.

Compared with an etching method using an organic solvent, according to the water jet method, the waste liquid can be processed easily.

Of course, as needed, it is also possible to process the surface part with an organic solvent for partially eliminating the resin component by softening or melting.

The organic solvent in this case can be selected corresponding to the resin component to be used. For example, a halogenated hydrocarbon such as an ethylene chloride, a methylene chloride and a chloroform, a carboxylic acid such as an acetic anhydride, an ethyl acetate, and a butyl acetate or an ester compound thereof, an acetone, a tetrahydro furan, a DMF, a DMSO, or the like can be presented.

Soaking the compact in the organic solvent, or spraying or dropping the organic solvent, and eliminating the softened or melted resin component from the surface part can form the surface ruggedness.

Or the resin component with a low hardness can be scraped off from the surface part by a wire brush, a cutting means, or the like.

By polishing the surface before roughing and applying the base surface process by the above-mentioned various means, the inorganic aggregate particles may be exposed to the product surface part as the cross-section. Thereby, the surface feeling with the unique depth and glossiness, and shine can be realized. This is derived from the light unique reflection phenomenon.

As to the roughing after polishing, in the present invention, it is particularly effective to execute the same by water jetting. In the roughing after polishing, the resin is peeled off as a fine cut piece so that the non-slipping artificial stone of the present invention can be produced effectively.

The means for the surface polish is not particularly limited, and using a tool such as a grinding stone, a polishing cloth, and a polishing belt, or using a polishing agent such as a buffing polishing agent, and a rubbing compound can carry it out.

As the polishing material, a diamond, a boron carbonate, a corundum, an alumina, or a zirconia mainly providing the polishing effect, a Tripoli, a dolomite, an alumina, a chromium oxide, a cerium oxide, or the like mainly providing the burnishing effect, or the like can be used optionally.

After applying such a polishing, the surface part can be roughed.

There are points to pay attention to in the present invention.

Figure 7:
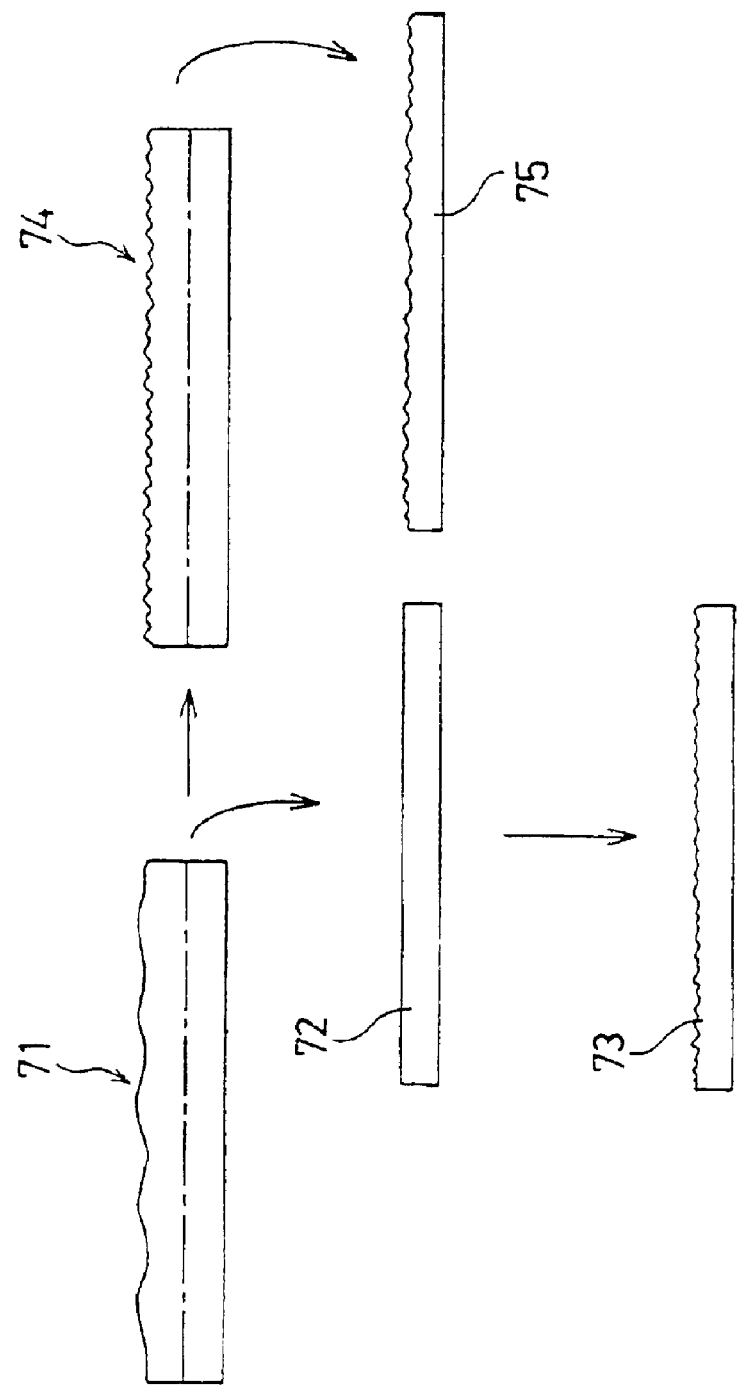
FIG. 7 is a diagram showing an mode of cutting an artificial stone and surface processing.

For example, as shown in FIG. 7, an artificial stone (73) provided by cutting out from an artificial stone (71) shaped after executing the above-mentioned shaping as placing and hardening as mentioned above, by a part having a plate thickness thinner than the plate thickness at the time of shaping, and applying the process on the surface of the cut out artificial stone (72) is also included in the non-slipping artificial stones of the present invention.

Moreover, although it is natural, as shown in FIG. 7, needless to say, an artificial stone (75) provided by cutting out into a thin plate-like shape an artificial stone (74) with the non-slipping process applied on the artificial stone (71) surface after shaping is also included in the non-slipping artificial stones of the present invention.

Then, according to the present invention, a non-slipping structure with the non-slipping artificial stone laminated as the surface material, and a non-slipping structure with the non-slipping artificial stone provided as a part of the surface are also provided.

As to the lamination structure, those having the non-slipping artificial stone of the present invention as the surface material and a resin plate, a metal plate, a stone material, a ceramic plate, a cement plate, or the like provided integrally on the rear surface thereof by using an adhesive, or mechanically by a metal bond or a fitting bond, or the like, can be presented.

Or one provided by injection molding of an inorganic material such as a mortar concrete and a gypsum, a resin, or the like after placing and hardening or in a semi hardening state of the non-slipping artificial stone of the present invention so as to be integrated, one provided by placing a tile, a gypsum plate, a metal plate, a glass, or the like at a predetermined position, and placing and hardening the non-slipping artificial stone of the present invention, and one provided by injecting the artificial stone of the present invention, and placing in the semi hardened state thereof a tile, a gypsum plate, a metal plate, a glass, or the like on the rear surface by a predetermined setting for compression hardening can be presented as examples.

Figure 8:
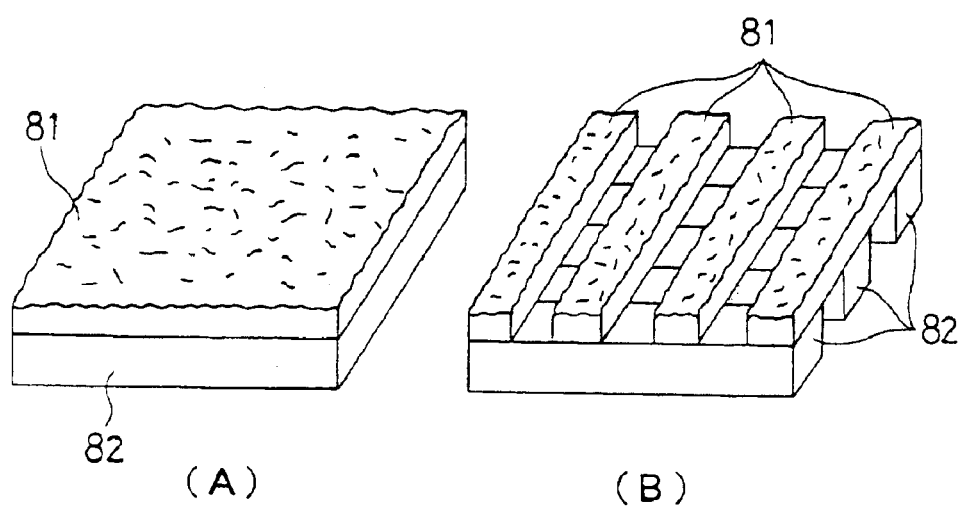
FIG. 8 is a diagram showing a laminated configuration using a non-slipping artificial stone.

According to the lamination structure, the non-slipping artificial stone (81) of the present invention may be not only the entire area lamination type with the other kind material (82) for example as shown in FIG. 8(A), but also various kinds such as a duckboard-like partial area lamination type as shown in FIG. 8(B), and one with a further multi layer structure.

Figure 9:
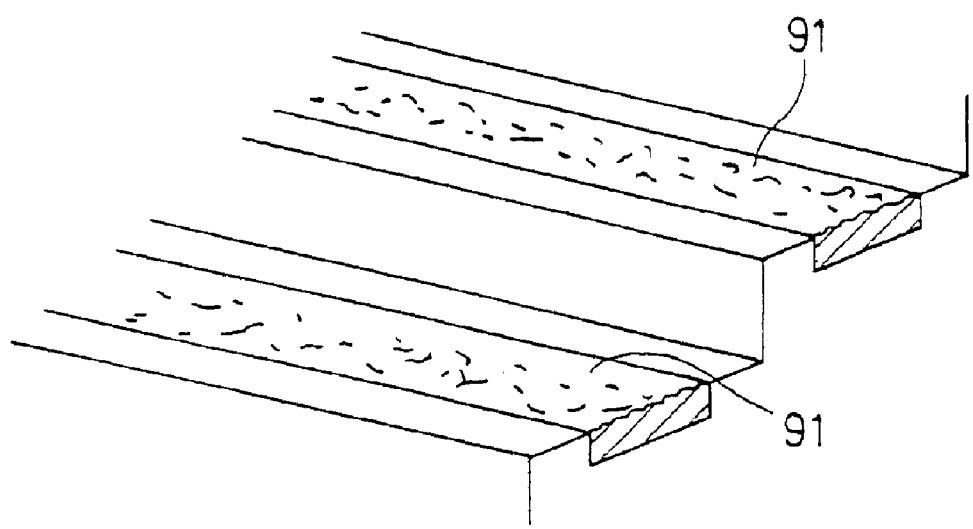
FIG. 9 is a diagram showing an example of embedding a non-slipping artificial stone.

Moreover, as a part of the surface, the configuration can be considered optionally, such as one having a non-slipping artificial stone disposed via a joint, and one having a non-slipping artificial stone (91) embedded only in a part of the steps, or the like as shown in FIG. 9.

Hereafter, the production embodiments of the non-slipping artificial stone of the present invention will be explained. Of course the present invention is not limited by the following embodiments.

EXAMPLES

Example 1

With quartz having a 2.5 mm maximum aggregate particle size and a 0.5 mm average aggregate particle size used as the inorganic aggregate, an MMA resin as the resin and an aluminum hydroxide as the filler material, a composition was prepared so as to be:

| | |
|---|---|
| Quartz aggregate | 47.28 vol % |
| Resin | 29.47 vol % |
| Aluminum hydroxide | 22.51 vol %. |
| The weight ratio thereof was: | |
| Quartz aggregate | 59.24 wt % |
| Resin | 14.63 wt % |
| Aluminum hydroxide | 25.76 wt %. |

For the composition, a slight amount of a silane coupling agent and a hardening agent were added.

A mixture of the aggregate or the like as an MMA resin syrup was introduced in the mold frame so as to be compression shaped into a 10 mm thickness plate material.

After releasing the mold, a roughing process was executed by jetting water jet by a 1,500 kg/cm$^2$ water pressure to the surface thereof by a nozzle from a 30 mm distance. Thereby, an artificial stone having a 0.2 mm surface recessed groove average depth was obtained.

The bending strength of the artificial stone was 306 N/cm, the hardness was a 7 Mohs hardness of the aggregate quartz, and the water absorption was 0.

Moreover, abnormality was not observed in an acid resistance, alkaline resistance test of soaking in a 3% aqueous solution of a hydrochloric acid for 8 hours, and soaking in a 3% aqueous solution of a sodium hydroxide for 8 hours.

Then, the non-slipping performance of the artificial stone was excellent as shown below.

| | |
|---|---|
| C.S.R. (men's shoes) | |
| Wet surface | 0.874 |
| Oily surface | 0.633 |
| C.S.R.B. (bare feet) | |
| Wet surface | 1.470 |
| Soap surface | 1.225 |

Example 2

In the example 1, only the composition ratio was changed to the following:

| | | |
|---|---|---|
| Quartz aggregate | 59.95 vol % | (69.07 wt %) |
| Resin | 23.51 vol % | (11.11 wt %) |
| Aluminum hydroxide | 17.96 vol % | (19.55 wt %) |

The non-slipping performance of the artificial stone having a 0.2 mm surface recessed groove average depth was excellent as shown below.

| | |
|---|---|
| C.S.R. (men's shoes) | |
| Wet surface | 0.851 |
| Oily surface | 0.618 |
| C.S.R.B. (bare feet) | |
| Wet surface | 1.478 |
| Soap surface | 1.202 |

INDUSTRIAL APPLICABILITY

As heretofore explained in detail, according to the invention of the present application, an artificial stone having the excellent feeling and tone, good surface hardness and wear resistance, and the excellent non-slipping property in the surface of preventing slipping at the time of walking thereon, or the like can be provided. Furthermore, a non-slipping artificial stone without having the color opaque by the water jet process can be provided.

The non-slipping artificial stone is useful for the interior floors of a bathroom, a toilet, a kitchen, or the like, the exterior floors of a poolside, an entrance, or the like, a bath tub, the other applications, the members for public institution such as an underground shopping mall passage, a step, and a railway platform, and furthermore, a wet floor surface and a floor surface with an oil component easily scattered in various kinds of working places, treatment plants, factories, or the like with existence of water or an oil inevitably.

What is claimed is:

1. A non-slipping artificial stone containing an inorganic aggregate and a resin, having a rugged surface with the inorganic aggregate exposed, and a surface recessed groove part, wherein the inorganic aggregate has a particle size distribution ratio of closest packing or in the vicinity thereof, the average depth of the surface recessed groove part is in a range of 0.02 mm or more and 1.0 mm or less, and the volume percentage of the inorganic aggregate is 25% or more and 75% or less.

2. The non-slipping artificial stone according to claim 1, wherein the average depth of the surface recessed groove part is 0.05 mm or more and 0.8 mm or less.

3. The non-slipping artificial stone according to claim 1, wherein the volume percentage of the inorganic aggregate is 35% or more and 65% or less.

4. The non-slipping artificial stone according to claim 1, wherein the inorganic aggregate exposed on the surface has a sharp corner part.

5. The non-slipping artificial stone according to claim 4, wherein the radius of curvature of the corner part is 1 mm or less.

6. The non-slipping artificial stone according to claim 1, wherein the maximum particle size of the inorganic aggregate is ½ or less of the plate thickness at the time of placing and hardening.

7. The non-slipping artificial stone according to claim 6, wherein the maximum particle size of the inorganic aggregate is 0.15 mm or more and 10 mm or less.

8. The non-slipping artificial stone according to claim 1, wherein the hardness of the inorganic aggregate is 5 or more in the Mohs hardness.

9. A non-slipping artificial stone containing an inorganic aggregate and a resin, having a rugged surface with the inorganic aggregate exposed, wherein the slip resistance value BPN (ASTM E303) is 60 or more on a wet surface, and 20 or more on an oily surface.

10. The non-slipping artificial stone according to claim 9, wherein the slip resistance value BPN is 65 or more on the wet surface, and 35 or more on the oily surface.

11. A non-slipping artificial stone containing an inorganic aggregate and a resin, having a rugged surface with the inorganic aggregate exposed, wherein the slip resistance value C. S. R. is 0.8 or more on a wet surface in the case of men's hard sole shoes.

12. The non-slipping artificial stone according to claim 11, wherein the slip resistance value C. S. R. is 0.45 or more on an oily surface.

13. A non-slipping artificial stone containing an inorganic aggregate and a resin, having a rugged surface with the inorganic aggregate exposed, wherein the slip resistance value C. S. R. B is 1.4 or more on a wet surface in the case of bare feet.

14. The non-slipping artificial stone according to claim 13, wherein the slip resistance value C. S. R. B is 0.8 or more on a soap-wet surface in the case of bare feet.

15. A non-slipping artificial stone containing an inorganic aggregate and a resin, having a rugged surface with the inorganic aggregate exposed, wherein the surface contact angle in the case of the distilled water is in a range of 45 to 75 degrees on average.

16. The non-slipping artificial stone according to claim 15, wherein the average contact angle is 55 to 72 degrees.

17. The non-slipping artificial stone according to claim 1, wherein the surface is provided with a water jet process by cutting or dividing into a predetermined shape or thickness, or without cutting or dividing after placing and hardening an artificial stone composition containing the inorganic aggregate and the resin in a shaping mold.

18. The non-slipping artificial stone according to claim 17, wherein a polish process is provided before the water jet process.

19. A non-slipping structure, wherein the non-slipping artificial stone according to claim 1 is laminated as a surface material.

20. A non-slipping structure, wherein the non-slipping artificial stone according to claim 1 is composed as a part of a surface.

21. The non-slipping artificial stone according to claim 2, wherein the volume percentage of the inorganic aggregate is 35% or more and 65% or less.

22. The non-slipping artificial stone according to claim 2, wherein the inorganic aggregate exposed on the surface has a sharp corner part.

23. The non-slipping artificial stone according to claim 3, wherein the inorganic aggregate exposed on the surface has a sharp corner part.

24. The non-slipping artificial stone according to claim 2, wherein the maximum particle size of the inorganic aggregate is ½ or less of the plate thickness at the time of placing and hardening.

25. The non-slipping artificial stone according to claim 3, wherein the maximum particle size of the inorganic aggregate is ½ or less of the plate thickness at the time of placing and hardening.

26. The non-slipping artificial stone according to claim 4, wherein the maximum particle size of the inorganic aggregate is ½ or less of the plate thickness at the time of placing and hardening.

27. The non-slipping artificial stone according to claim 5, wherein the maximum particle size of the inorganic aggregate is ½ or less of the plate thickness at the time of placing and hardening.

28. The non-slipping artificial stone according to claim 2, wherein the hardness of the inorganic aggregate is 5 or more in the Mohs hardness.

29. The non-slipping artificial stone according to claim 3, wherein the hardness of the inorganic aggregate is 5 or more in the Mohs hardness.

30. The non-slipping artificial stone according to claim 4, wherein the hardness of the inorganic aggregate is 5 or more in the Mohs hardness.

31. The non-slipping artificial stone according to claim 5, wherein the hardness of the inorganic aggregate is 5 or more in the Mohs hardness.

32. The non-slipping artificial stone according to claim 6, wherein the hardness of the inorganic aggregate is 5 or more in the Mohs hardness.

* * * * *